May 7, 1957  J. C. JACOB, SR  2,791,201
SELF-SERVICE MACHINE FOR DOGS
Filed Dec. 8, 1955  2 Sheets-Sheet 1
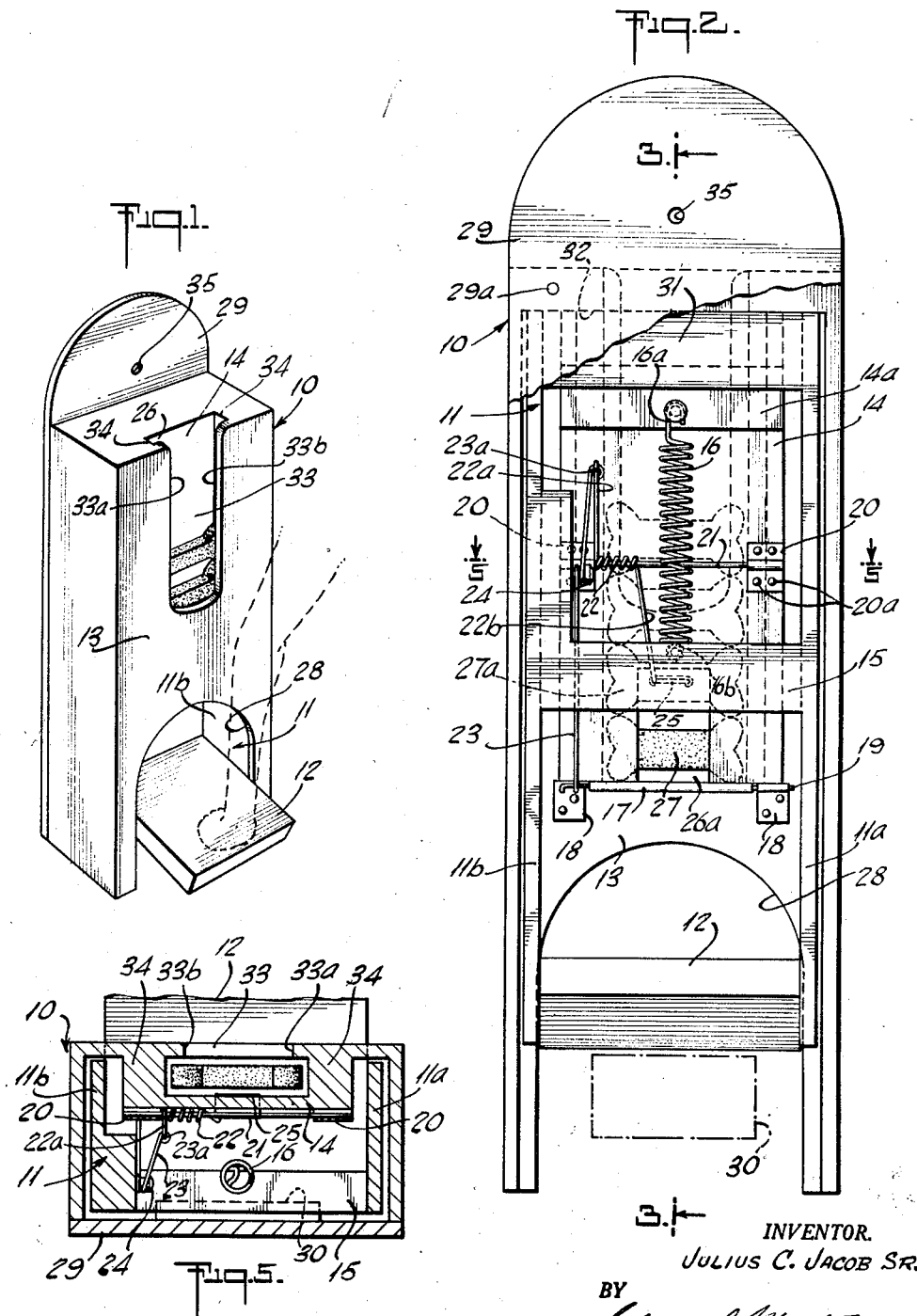
INVENTOR.
JULIUS C. JACOB SR.
BY
Charles R. Morton
ATTORNEY May 7, 1957 J. C. JACOB, SR 2,791,201
SELF-SERVICE MACHINE FOR DOGS
Filed Dec. 8, 1955 2 Sheets-Sheet 2
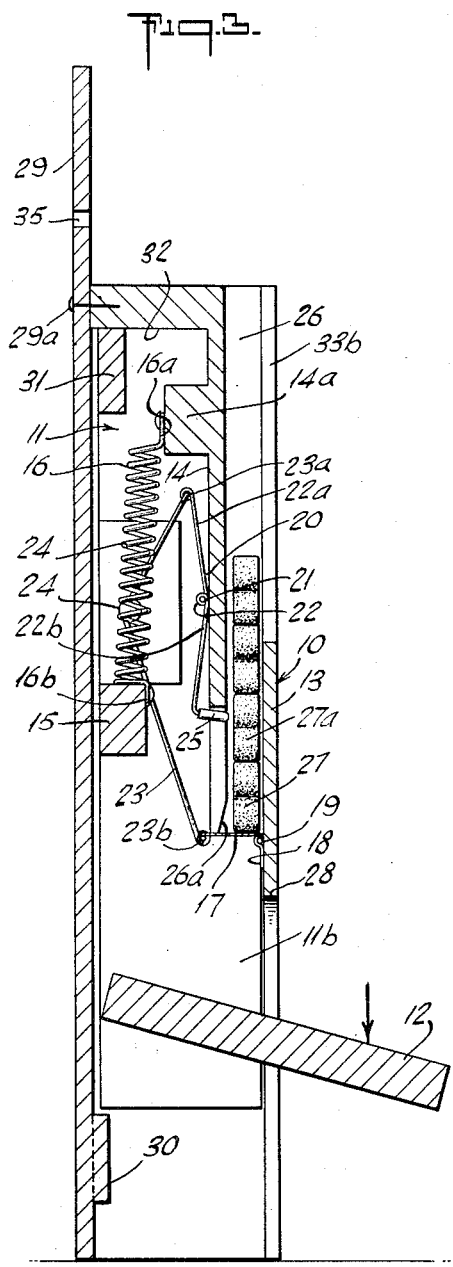
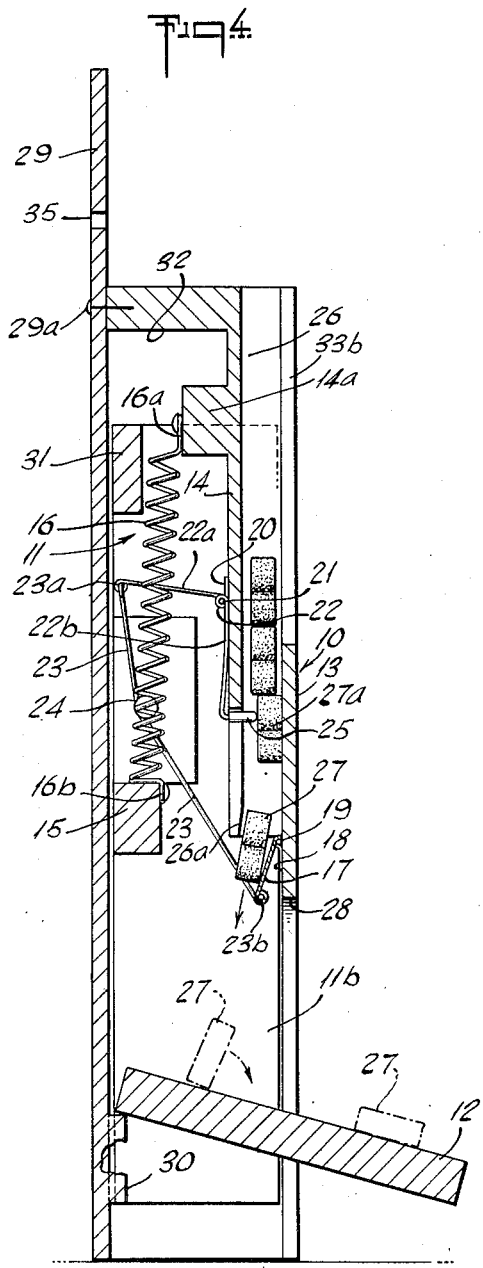
INVENTOR.
JULIUS C. JACOB SR.
BY
Charles A. Morton
ATTORNEY

2,791,201

SELF-SERVICE MACHINE FOR DOGS

Julius C. Jacob, Sr., Freeport, N. Y.

Application December 8, 1955, Serial No. 551,862

3 Claims. (Cl. 119—55)

This invention relates to a machine for training an animal to effect the self-service of food stored in tablet form in said machine, and is particularly adapted for training a dog to effect the self-service of dog biscuits or the like.

One object of this invention is to teach a pet animal where and how to obtain food, when hungry.

Another object is to teach a dog how to manipulate a self-service machine to dispense dog biscuits stored therein.

Other objects will appear from the detailed description.

In accordance with this invention, food is stored in tablet form in a self-service machine and is exposed therein in such a way that the animal by the exercise of its visual and olfactory senses learns to associate its food with said machine and is taught to manipulate the machine to procure the food exposed therein, so that when hungry the animal in exercising its olfactory and visual senses is attracted to the machine by the stored food exposed therein and is thereupon reminded to manipulate the machine as it has been taught to do and thus procure its food.

One form of the invention in the form at present preferred, consists in the construction, arrangement and combination of elements hereinafter more fully described and illustrated by the accompanying drawing, in which—

Fig. 1 is a perspective view of my food dispensing or self-service machine; Fig. 2 is an enlarged rear view of said machine with the back cover partially broken away and removed; Fig. 3 is a vertical cross sectional view of the machine taken along the line 3—3 of Fig. 2 looking in the direction of the arrows; Fig. 4 is a vertical cross sectional view similar to Fig. 3 but showing the machine in dispensing position; and Fig. 5 is a horizontal cross sectional view taken along the line 5—5 of Fig. 2 looking in the direction of the arrows.

The machine includes a fixed outer case or housing 10, and an inner case or A-frame 11, mounted to slide up and down in said fixed outer case 10. Near the lower end of said A-frame its side walls 11a, 11b are interconnected and cross braced by the paw pedal 12 which inclines downwardly through an arched opening formed in the lower portion of the front wall 13 of outer case 10, so that an article of food in tablet form, such as an animal cracker or dog biscuit, falling upon the surface of paw pedal 12, will glide, under the influence of gravity, through the dispensing or delivery chute 28, to the floor.

The outer case 10 includes the front wall 13 which is fenestrated to form a window opening 33, and an inner or partition wall 14 positioned behind front wall 13 and separated therefrom by the channel walls 34, 34. The fenestrated front wall 13, partition wall 14, and channel walls 34, 34, in conjunction, confine a vertical channel or guide slot 26, for containing a stack of dog biscuits 27, 27a, or the like, piled one above another (Figs. 2 to 5). The edge faces 33a and 33b of the window opening 33 project inwardly and beyond the channel walls 34, 34 to overlie the guide slot 26 (Fig. 5) and the ends of the dog biscuits 27, 27a stored therein.

A cross piece 15 interconnects and cross braces the side walls 11a, 11b of inner case 11 to complete the A-frame and to provide an anchorage for one end of a coiled (main) spring 16. The upper end of the main spring 16, is secured at 16a to a rib 14a of the partition wall 14 of fixed outer case 10, and the lower end of said spring is secured at 16b to the cross piece 15, so that, when paw pressure is applied to paw pedal 12, the inner case 11 slides downwardly in outer case 10 (Fig. 4), thereby increasing the tension in main spring 16, and when paw pressure is removed from paw pedal 12, main spring 16 retracts and restores inner case 11 to its normal position (Fig. 3). The outer and inner cases 10 and 11, and their associated cross pieces and braces may be made of wood, metal, or plastic materials, and if made of metal or of plastic materials, may be cast or moulded.

The guide slot 26 defines a gravity feed chute for feeding the dog biscuits 27, 27a downwards, and said slot 26 is open at the bottom to form a delivery throat in the outer case 11. A shutter 17 is hinged to the outer case 10 between the plates 18, 18 in such manner that the shutter 17 registers in or with the delivery throat 26a of the guide slot 26 to normally close said delivery throat 26a and arrest the passage of the dog biscuit 27 through the delivery throat. The pin 19 forms the pivot for the shutter 17, and the shutter 17 may be caused to swing upon the pivot pin 19 from its closed position (Fig. 3) to its open position (Fig. 4), under control of the lever arm 23 which is hinged to the pin 23b which is attached to the swinging end of the shutter 17 (see Figs. 3 and 4).

Two plates 20, 20 are fastened with suitable nails 20a, 20a (Fig. 2) to the inner face of the partition wall 14 of outer case 10 to support the pin 21. A coiled spring 22 is mounted to rock about the pin 21 under control of the lever arm 23 which is mounted to turn about its pivot 24 mounted upon inner case 11 (Figs. 2 and 4). The coiled spring 22 is provided with two extension arms 22a, 22b. The extension arm 22a is hinged at 23a to one end of the lever arm 23, while the extension arm 22b is free and terminates in a finger 25 which is normally positioned in spaced relation to the next to the lowest biscuit 27a in the stack of dog biscuits, but which yieldably engages the biscuit 27a when the shutter 17 starts to open (Fig. 4), and thus prevents the premature release of the biscuit 27a as the biscuit 27 falls through the delivery throat 26a (Fig. 4), and drops upon the pedal 12 whence it is discharged through the delivery chute 28 (Fig. 2).

The back cover 29 is attached to the edge faces of the outer case 10 with suitable nails or screws 29a, thus closing the outer case 10 and forming a housing wherein the inner case 11 may slide up and down under control of the pedal 12 and the coiled spring 16. A rib formed upon or fastened to the back cover 29 near the lower end thereof, provides a stop 30 which is engaged by the pedal 12 (Fig. 4), to limit the downward sliding movement of the inner case 11. A rib or cross piece 31 fastened between the sides walls of the inner case at the upper edge thereof, forms a stop which engages the inner face of the top wall 32 of the outer case 10 to limit the return movement of the inner case 11 when it telescopes into the outer case 10 under the influence of the coiled main spring 16.

The front wall 13 of the outer case 10 is provided with a central opening or window 33 through which the dog biscuits are exposed to enable the dog (or other animal) to subject the biscuits to visual and olfactory inspection and detection.

When the machine is in normal position, the inner case 11 is telescoped inside the outer case 10, thus turning the lever arm 23 about its pivot 24 to the position best shown in Fig. 3, to draw the shutter 17 upwards at 23b upon the hinge pin 19 into a substantially horizontal position, thus closing off the delivery throat 26a and supporting the dog biscuit 27 upon the shutter 17 (Figs. 2 and 3). The spring 22 has also been rocked about its pin 21 in a clockwise direction by the lever arm 23, thus positioning the finger 25 away from the dog biscuit 27a in spaced relation, substantially as shown in Fig. 3. When sufficient pressure is applied to the pedal 12, inner case 11 slides downwards in outer case 10 to move the pivot 24 downwards, but as the pin 21 is mounted upon the outer case 10 it remains stationary, hence the lever arm 23 carries the arm 22a of coiled spring 22 downwards and counterclockwise and the lever arm 23 swings about its sliding pivot 24 in a counterclockwise direction, and at the same time the holding finger 25 moves into engagement with the dog biscuit 27a thus preventing the dog biscuit 27a from sliding downwards in the gravity feed chute formed by the guide slot 26. Moving lever arm 23 counterclockwise also opens the shutter 17 which is supporting the dog biscuit 27 thus leaving the dog biscuit 27 free to pass out through the delivery throat 26a and to fall upon the pedal 12. When the holding finger 25 engages the dog biscuit 27a the arm 22b of spring 22 can not swing further, but the opposite arm 22a must follow lever arm 23, thus building up tension in coiled spring 22 and consequently in the arm 22b to increase the pressure of the holding finger 25 against the biscuit 27a. When the inner case approaches the lower limit of its travel, the pedal 12 engages against the stop 30, thus arresting said downward movement, and when pressure is removed from the pedal 12, coiled spring 16 contracts and telescopes inner case 11 inside outer case 10 until this upward return motion is arrested by the stop 31 engaging the inside face of upper wall 32 of outer case 10.

The guide slot 26 is sized to receive, hold and feed, a column of dog biscuits 27, 27a, etc., when they are inserted in said guide slot one above another, and the dog biscuits are exposed through the window opening 33, so that the dog, or other pet, can both see and smell them. During said examination, the dog will invariably place one of its front paws upon the pedal 12 (see Fig. 1), causing the machine to function in the manner described and dispense a dog biscuit, but the holding finger 25 only permits one dog biscuit to be dispensed at a time. The holding finger may be adjusted, if desired, to release more than one dog biscuit at a time, but dispensing only one biscuit at a time gives good results when training the pet to operate the machine.

The pet may be taught to operate the machine, and once the pet has been so trained, it will manipulate the machine of its own accord, and when the machine is empty will bark or otherwise attract attention to the empty condition of the machine.

The capacity of the machine may be increased by increasing the height of the guide slot 26, but a machine which is of sufficient capacity to hold a one day's supply of dog biscuits gives very satisfactory results because the biscuits are always fresh.

It should be understood that while the machine has been described as a dispenser of dog biscuits, it may be used for dispensing other forms of tablet food, and for other pet animals instead of dogs.

The back cover 29 is provided with a central hole 35 which is large enough to receive a wood screw or a nail for attaching the outer case 10 to a wall or other stationary object by means whereof the machine is retained in an upright position. If additional anchorage is required, as for a large dog, angle brackets may be used to secure the side walls of the outer case 10 to the floor or wall.

What is claimed is:

1. In a machine for dispensing animal crackers such as dog biscuits and in combination an outer casing, an inner casing supported to slide up and down within said outer casing, said outer casing having a gravity-controlled feed slot formed therein for supporting a column of animal crackers arranged one above another in said slot, the lower end of said feed slot being open to define a delivery throat through which the animal crackers may be delivered when released from said column, a pedal attached to the lower end of said inner casing, a coiled spring positioned within said casings, one end of said spring being attached to said outer casing and the other end being attached to said inner casing, said spring telescoping said inner casing in said outer casing, said feed slot having a central aperture formed therein for facilitating visual and olfactory detection of animal crackers stored in said feed slot, a shutter pivotally supported upon the outer casing to close and open said delivery throat, a shutter lever pivotally mounted upon the inner casing, said lever having two ends, one of said ends being linked to and normally retaining said shutter in throat-closing position, a double ended coiled spring, a pin passing through the coil of said last mentioned coiled spring and supported upon said outer casing to pivotally support said last mentioned coiled spring upon said outer casing, one end of said last mentioned coiled spring being secured to the otherwise free end of said shutter lever, the opposite end of said last mentioned coiled spring terminating in a finger normally positioned opposite a pre-selected intermediate cracker in the column of animal crackers in the feed slot, and said shutter lever being operable responsive to the downward sliding movement of said inner casing by pressure applied to said pedal to first move said finger into yielding engagement with said pre-selected intermediate cracker to arrest the downward movement of said pre-selected cracker and of the remaining crackers in the column thereabove and to thereafter move said shutter to throat-opening position to release the bottom cracker in the feed column.

2. In a machine for animal-dispensed animal crackers such as dog biscuits and in combination an outer casing, an inner casing slidably supported within said outer casing for up and down movement therein, said outer casing having a gravity-controlled feed slot formed therein for housing a column of animal crackers arranged one above the other in said feed slot, said feed slot having an opening formed therein for permitting visual and olfactory exposure of the animal crackers stored therein, the lower end of said feed slot being open to define a delivery throat through which an animal cracker may be discharged when released from said column, spring mechanism attached to said inner and outer casings under sufficient tension to normally slide said inner casing upwardly into said outer casing, a pedal attached to said inner casing and extending through the wall of said outer casing, said pedal being operable under foot pressure applied thereto to slide said inner casing downwardly in said outer casing under increased tension of said spring mechanism, a shutter pivotally supported upon the outer casing in cooperative registry with said delivery throat to close and open the same, a shutter lever pivotally supported by said inner casing, one end of said shutter lever being pivotally connected to said shutter to normally close off said delivery throat and support the column of animal crackers in said feed slot, a coiled spring pivotally supported by said outer casing, one end of said coiled spring being joined to the otherwise free end of said shutter lever, the opposite end of said coiled spring terminating in a holding finger, said holding finger being normally positioned opposite an intermediate animal cracker in said column of animal crackers, said shutter lever being progressively operable as said inner casing slides downwardly in said outer casing responsive to foot pressure applied to said pedal to first move said holding finger into engagement with the oppositely positioned intermediate animal cracker to arrest downward movement of the finger-engaged cracker and the column of animal crackers thereabove and to thereafter open said shutter and release the animal cracker supported by said shutter when closed, and said spring mechanism being operable when foot pressure is released from said pedal to withdraw said inner casing upwardly into said outer casing to cause said shutter lever to close said shutter in normal position and thereafter return said holding finger to its normal position and allow the column of animal crackers to move downwardly in said feed slot until arrested by and supported upon said closed shutter.

3. In a machine for dispensing animal crackers such as dog biscuits and in combination a casing having a feed slot formed therein for aligning animal crackers one above another when housed in said feed slot, said feed slot having an opening formed therein for permitting visual and olfactory detection of animal crackers housed therein and an exit opening defining a delivery throat through which when open the animal crackers may be gravity dispensed from the bottom in ordered succession when afforded free passage through said feed slot, a shutter normally closing said delivery throat to arrest the free passage of the bottom animal cracker, a pedal positioned adjacent the lower end of and slidably supported by said casing, a pivot pin mounted upon and movable with said slidable support, a double ended shutter lever pivotally supported by said pivot pin, one end of said shutter lever being so connected to said shutter as to normally move said shutter into its normal and throat-closing position, a double ended coiled spring, a pin passing through the coil of said coiled spring and supported upon said casing, one end of said coiled spring being secured to the otherwise free end of said shutter lever, the opposite end of said coiled spring terminating in an extension finger which is normally positioned opposite a preselected animal cracker above the bottom animal cracker housed in said feed slot, said slidably supported pedal being operable responsive to pressure applied thereto to move said pivot pin and thus impart rocking movement to said shutter lever, said shutter lever in rocking first bringing said finger into spring controlled engagement with said preselected animal cracker to arrest its passage and the passage of the animal crackers thereabove through the feed slot and thereafter opening said shutter to afford free passage through said delivery throat under the influence of gravity of the bottom animal cracker, and means operable when said pedal is released to restore said pivot pin to normal and rock said shutter lever in the reverse direction to first return said shutter to throat-closing position and thereafter disengage said finger from said finger-engaged animal cracker to allow said animal crackers to move downwardly in said feed slot until their further passage is again arrested by the throat-closed position of said shutter.

References Cited in the file of this patent
UNITED STATES PATENTS 2,142,053    Hoban _____ Dec. 27, 1938

FOREIGN PATENTS 776,905    France _____ Nov. 17, 1934